United States Patent [19]

Mott

[11] 3,967,439
[45] July 6, 1976

[54] CROP DIVIDER FOR A HARVESTER

[75] Inventor: Roger Eugene Mott, Bettendorf, Iowa

[73] Assignee: Deere & Company, Moline, Ill.

[22] Filed: July 24, 1975

[21] Appl. No.: 598,851

[52] U.S. Cl. ............................................. 56/314
[51] Int. Cl.² .................................... A01D 63/00
[58] Field of Search ........................... 56/314–320

[56] References Cited
UNITED STATES PATENTS 3,885,377   5/1975   Jones .................................... 56/314

FOREIGN PATENTS OR APPLICATIONS 921,279   1/1947   France .................................. 56/314

*Primary Examiner*—Russell R. Kinsey

[57] ABSTRACT

A self-propelled combine has a forward transversely elongated platform with opposite side walls and a transverse harvesting reel extending between the side walls above the cutter bar along the leading edge of the platform. The reel is mounted on a pair of vertically adjustable arms, and a pair of crop dividers are respectively mounted on and extend forwardly of the opposite side walls on transverse pivots that permit vertical floating movement of the crop dividers. The crop dividers have a forwardly converging sheet metal exterior that tapers to a forward shoe that normally rides along the ground, and the inside wall of the sheet metal exterior is disposed inwardly and forwardly of the opposite ends of the reel to deflect crop material away from the opposite ends of the reel and prevent wrapping thereon. The dividers are connected to the reel lift arms by a lost motion mechanism that permits the lifting of the dividers to a transport position after the reel is raised a predetermined amount, and the connection also includes an outrigger that permits the vertical floating movement of the divider while providing lateral stability therefor.

17 Claims, 4 Drawing Figures

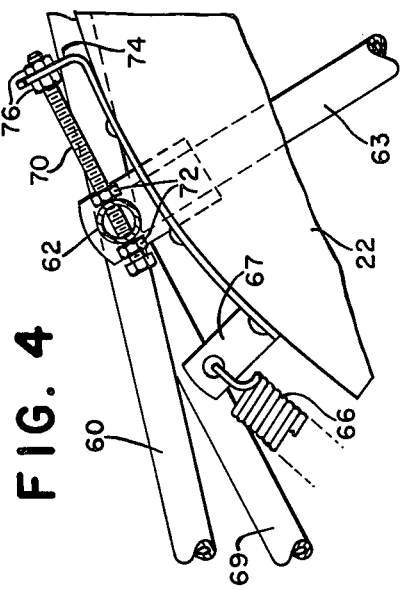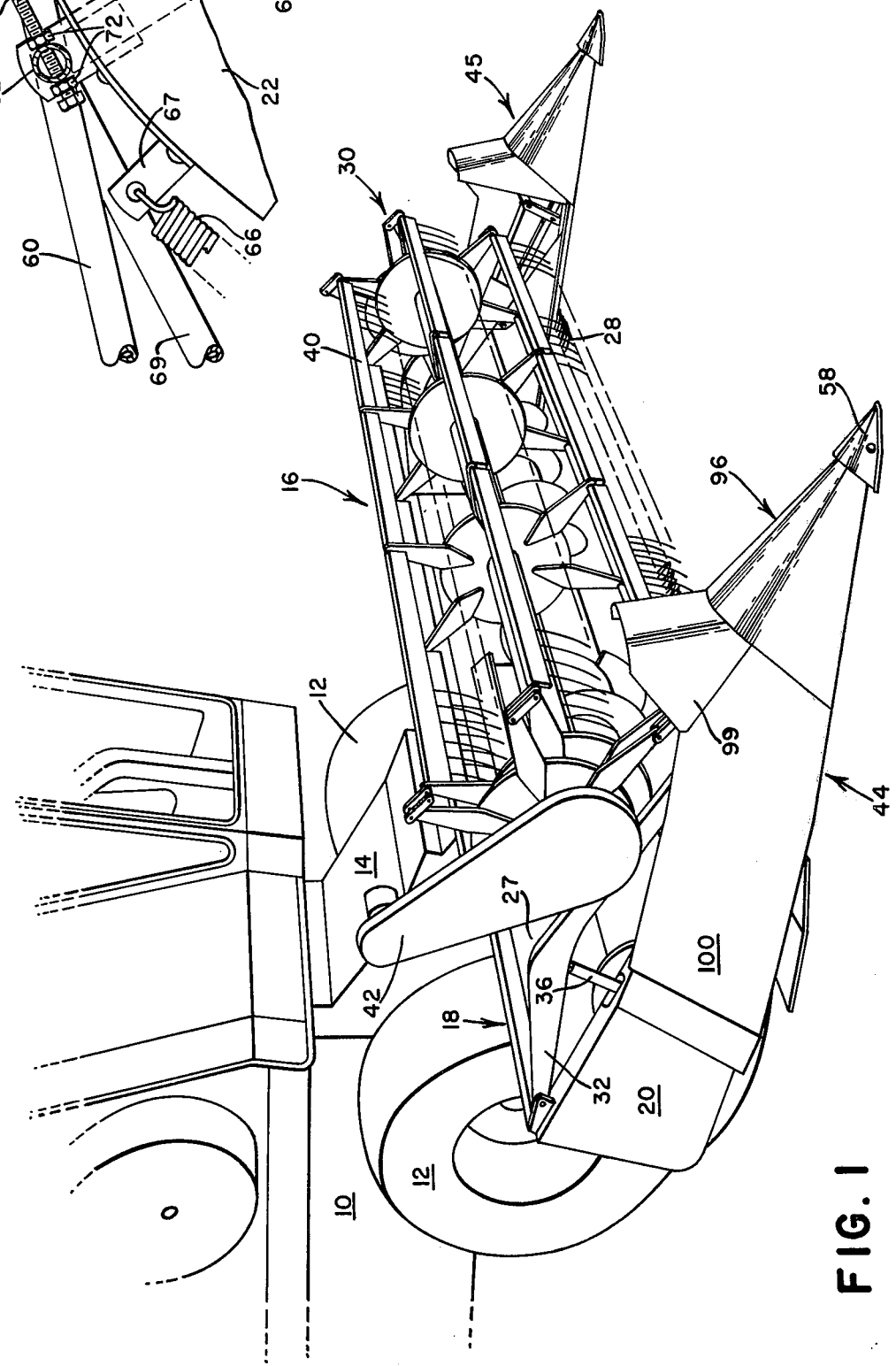

CROP DIVIDER FOR A HARVESTER

BACKGROUND OF THE INVENTION

This invention relates to an agricultural harvesting machine, and more particularly to an improved crop divider that is provided at the end of a harvesting header or platform to divide the swath of crop that is to be harvested from the standing crop.

Such dividers are well known, and are frequently provided as optional attachment for cutter bar type harvesting platforms, the forward pointed ends of the dividers extending substantially fowardly of the opposite ends of the cutter bar and the opposite ends of the reel that is normally disposed above the cutter bar.

It is known to provide a pivot mounting for such dividers so that the dividers are free to swing in a vertical arc to follow the contour of the ground, spring means being conventionally provided to partially counterbalance the weight of the dividers.

SUMMARY OF THE INVENTION

According to the present invention, there is provided an improved divider for attachment to the side wall of a havesting platform or header. More specifically, improved means are provided for mounting the divider on the harvesting header side wall to permit vertical swinging floating movement of the divider while providing lateral stability and strength therefor.

An important feature of the invention is to provide a connection between the divider and the vertically adjustable reel so that the divider can be raised to a transport position by raising the reel. Also, a lost motion mechanism is provided in the connection between the reel and the divider to permit a certain amount of adjustment of the vertical position of the reel without affecting the operating position of the divider.

Another feature of the invention resides in the provision of an inner side wall on the divider that is disposed inwardly from the end of the reel to deflect crop material inwardly from the end of the reel and thereby prevent wrappage of crop material around the reel end.

Another feature of the invention resides in the provision of a locking device for optionally locking the divider to the header side wall to eliminate the vertical swinging adjustment thereof. Also, there is provided an adjustable stop to limit the downward floating adjustment of the divider relative to the rest of the platform.

Also, according to the invention, there is provided an outrigger member pivotally connected to the platform side wall and slidably engaging a member on the divider frame that permits vertical adjustment of the divider while providing bracing to prevent lateral movement of the divider.

BRIEF DESCRIPTION OF THE DRAWINGS

FIG. 1 is a right front perspective of the forward portion of a self-propelled combine with a cutter bar type harvesting platform mounted thereon and having a pair of improved dividers according to the invention mounted on the opposite sides of the platform.

FIG. 4 is an enlarged side elevation sectional view of the locking mechanism between the divider and the platform side wall when the divider is rigidly locked to the platform side wall as viewed along the line 4—4 of FIG. 3.

DESCRIPTION OF THE PREFERRED EMBODIMENT

Figure 2:
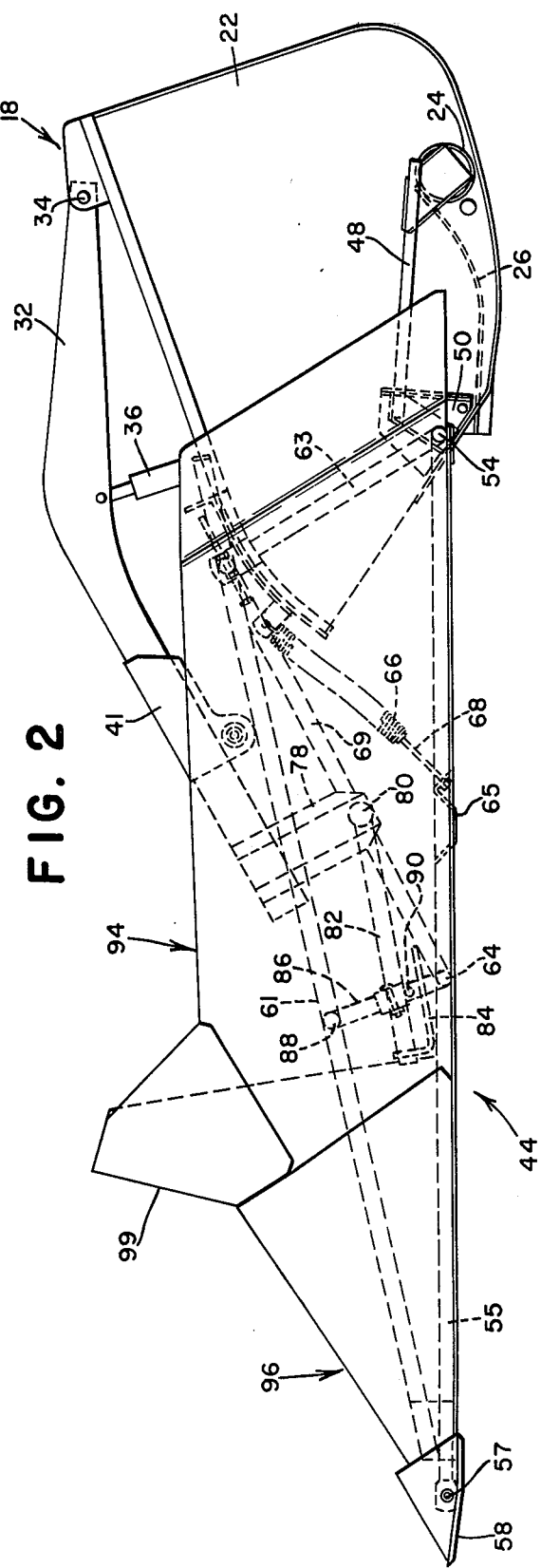
FIG. 2 is a side elevation view of the left divider in operating position.

The invention as embodied in a self-propelled combine having a main separator body, only the forward portion of which is shown in the drawing and indicated by the numeral 10. The combine is mounted on a pair of forward drive wheels 12 and steerable rear wheels and includes a forwardly extending, vertically adjustable feeder house 14 through which crop material is fed from a cutter bar type harvesting platform 16 to a threshing and separating mechanism within the combine body. All of the above represents conventional combine construction.

As is also conventional, the platform 16 is transversely elongated an includes a frame 18 and right and left, upright, fore and aft side walls 20 and 22 at the opposite ends of the platform. The frame includes a transverse tubular beam 24 at the lower rearward end of the platform, and the platform includes a floor 26 that extends between the opposite side walls, the rearward end of the floor seating against the top of the frame tube 24 and curving upwardly to merge with a platform rear wall 27.

A cutter bar 28 spans the width of the platform along the leading edge of the floor, and pickup type harvester reel 30 also spans the width of the platform immediately above the cutter bar 28. The reel is mounted for vertical adjustment on a pair of fore and aft support arms 32 rspectively pivotally connected to the upper rear portion of the platform frame by transverse pivots 34. The reel support arms are above and in general alignment with the opposite side walls, and their position is established by a pair of lift cylinders 36 operating between a central portion of the arms and the side walls. The reel includes a plurality of transverse reel bats 40 having depending tines that maintain a constant vertical disposition as the reel rotates. Such reels are well known and the reel will not be described in detail, the reel utilizing an eccentric mechanism to maintaian the position of the reel bats while the reel rotates. The reel is mounted between a pair of support members 41 that are mounted for fore and aft adjustment on the reel arms, and the reel is driven by a hydraulic drive that is substantially obscured by the drive shielding 42 in FIG. 1.

Mounted on and extending forwardly from the right and left side walls 20 and 22 are right and left dividers 44 and 45 respectively. Since the dividers are substantially mirror images of one another, both dividers will not be described in detail, only the left divider 45 being shown and described in detail herein.

The divider includes a frame indicated in its entirety by the numeral 46 and detachably mounted on the platform frame 18. The frame includes a rear fore and aft support arm 48, that has its rearward end detachably connected to the end of the platform frame tube 24 and carries a pair of upright fore and aft brackets 50 at its forward end, the brackets being connected by a transverse support tube 52. A pair of coaxial transverse rear pivots 54 are mounted in the respective brackets 50 and a pair of fore and aft bottom frame members 55 are respectively mounted on and extend forwardly from the pivots 54. The inner bottom frame member 55 is generally straight and extends in a fore and aft direction, while the outer bottom frame member is bent and extends inwardly, the forward ends of the frame members 55 being connected and carrying a transverse front pivot 57. Mounted on the pivot 57 is a generally triangular, forwardly pointed shoe 58 that normally rides along the ground and swings on the pivot 57 to follow the contour of the ground.

The divider frame also includes inner and outer top frame members 60 and 61 generally above the bottom frame members 55 and inclined upwardly and rearwardly from the forward ends of the bottom frame members. The rearward ends of the top frame members 60 and 61 are connected by a transverse tubular support 62, and a pair of upwardly and forwardly inclined vertical supports 63 respectively connect the rearward ends of the outer frame members and the rearward ends of the inner frame members to provide a pair of triangular innerconnected frames. The two triangular frames are also connected by a tubular forward front transverse support 64 and a plate-like transverse support 65 rearwardly of the support 64. An upwardly and rearwardly inclined helical tension spring 66 extends between a bracket 67 mounted on the top of the side wall 22 adjacent the forward end of the side wall and the support 65, the spring being connected to the support 65 through an adjustable bolt 68 that permits adjustment of the spring tension. An upwardly and rearwardly inclined support 69 interconnects the supports 62 and 64.

Extending through the upper rear tube 62 is a generally fore and aft elongated bolt 70 that is positioned therein by a pair of lock nuts 72 threaded on the bolt and engaging the opposite sides of the tube. The bolt 70 is in fore and aft alignment with the spring bracket 67, and when the divider swings downwardly about the divider pivots 54, the end of the bolt engages the bracket to limit further downward movement of the divider. As is apparent, adjustment of the lock nuts permits adjustment of the position of the bolt to adjust the lowermost position of the divider.

The rearward end of the lock bolt is extendable through a hole 73 in a lock bracket 74 mounted on the top of the side wall 22 to the rear of the bracket 67, and the bolt 70 can be adjusted rearwardly so that it extends through the hole 73 and is retainable therein by a pair of lock nuts 76 engaging the opposite side of the bracket 74, as shown in FIG. 4. As is apparent, when the lock bolt is connected to the bracket 74, the divider is no longer free to pivot about the pivots 54 and thereby is rigidly locked to the platform side wall.

Mounted on and depending from the forward end of the reel arm 32 is a bracket 78 that carries a transverse pivot 80, and a generally fore and aft outrigger or support member 82 is swingably mounted on and extends forwardly from the pivot 80. An L-shaped stop arm 84 depends from the forward end of the outrigger member 82 and extends rearwardly therefrom. Mounted on and extending upwardly from the tubular front support 64 are a pair of upright supports 86 that have their upper ends connected by a transverse member 88 also connected to the outer top frame member 61. A transverse stop shaft 90 extends between the members 86 between the rearwardly extending portion of the stop arm 84 and the outrigger member 82, the outrigger member resting on the stop shaft 90. Mounted on the respective upright supports 86 are a pair of slide members 92. As is apparent, the slide members 92 are generally U-shaped and the intermediate portion of the members abut the opposite sides of the outrigger member 82.

The outrigger member is slidable in a fore and aft direction between the two slide members 92 to permit vertical adjustment of the divider about the rear pivots. However, the engagement of the slide members with the opposite sides of the outrigger member prevents lateral movement of the forward end of the divider frame to provide lateral support and rigidity of the divider frame.

When the reel lift arm 32 is raised by the cylinder 36, the pivot 80 is similarly raised, which eventually pulls the outrigger member rearwardly, the slide members 92 permitting the rearward movement until the stop arm 84 abuts the stop shaft 90, whereupon additional upward movement of the reel arm causes the divider to raise about its rear pivot.

Figure 3:
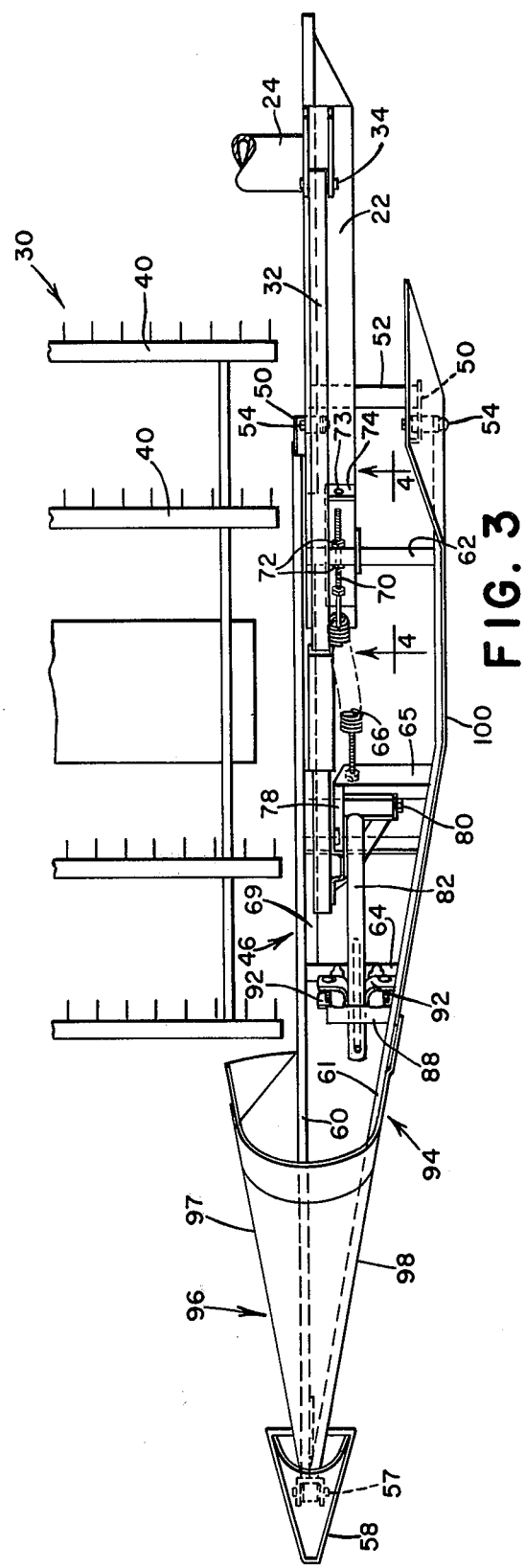
FIG. 3 is a top plan view of the divider shown in FIG. 2 with the left end of the reel schematically illustrated.

A forwardly tapered skin or shielding 94 is mounted on the divider frame 46 and includes a generally triangular forward portion 96 that has a fore and aft horizontal bottom and converges or tapers downwardly and forwardly to the front shoe 58 which forms a forward point for the forward portion of the shielding. The forward portion includes inner and outer walls 97 and 98 that respectively diverge rearwardly from the forward point, the outer wall being connected to the outer frame members. As best shown in FIG. 3, the inner wall extends inwardly of the inner frame member, and the rearward end of the inner wall overlaps or is substantially inwardly from the end of the reel bats 40 to prevent wrappage of crop material about the conventional shafts that mount the reel on the reel support arm. A generally upright deflector member 99 extends upwardly from the rearward end of the rearward portion, and the shielding or skin also includes a generally fore and aft outer side wall 100 that extends rearwardly from the outer wall 98 to overlap the platform side wall 22.

In operation, when the improved dividers are to be used on the platform 16, the dividers can be simply attached by connecting the brackets 78 to the forward ends of the reel lift arms 32 and connecting the support arms 48 on the opposite side walls of the platform. The brackets 67 and 74 are also mounted on the top edge of the side walls, and the spring 66 is connected to the bracket 67.

In normal operation, the machine is operated so that the dividers ride along the ground, the pivoting shoes 58 engaging the ground while the springs 66 are adjusted to substantially counterbalance the weight of the divider. The dividers float vertially about the pivots 54 to follow the contour of the ground. During the vertical floating adjustment of the divider, the outrigger member slides in a fore and aft direction relative to the slide elements 92, the outrigger member 82 providing lateral stability or bracing for the divider while permitting the vertical adjustment. As previously described, the downward floating movement of the dividers is limited by the engagement of the front end of the stop bolt 70 with the brackets 67 on the side walls, and the stop position can be adjusted by adjustment of the bolt 70. If the operator wishes to rigidly lock the dividers to the platform side walls, the bolts 70 can be threaded rearwardly so that they extend through the holes 73 in the brackets 74 attached to respective the side walls, the bolts being secured to the brackets by the lock nuts 76 to rigidly lock the respective dividers to the side walls.

In normal operation, when the dividers are riding along the ground, the dividers can be raised from their operating position to a raised transport position by raising the reel lift arms 32. As previously described, the initial raising of the arms 32 does not affect the divider until the arms are raised sufficiently that the stop arms 84 engage the stop shaft 90, after which additional movement of the reel lift arms will also raise the dividers. The lost motion during the initial raising of the reel lift arms permits some vertical adjustment of the reel without affecting the dividers and also permits the vertical floating of the dividers.

Preferably, the pivots 54, 80, and 57 are all provided with rubber bushings to reduce vibration of the divider and platform. As also previously described, the inner wall 97 of each divider member overlaps the ends of the reel bats 40 to prevent wrappage of crop material around the ends of the reel.

I claim:

1. In a harvesting machine having a forwardly disposed transversely elongated platform including a frame with opposite upright side walls and a crop handling means mounted on the frame and including a harvester reel mounted on and extending between a pair of generally fore and aft arms mounted on the frame for vertical adjustment and including control means for controlling the position of the arms, and transverse crop engaging members having opposite ends inwardly of and adjacent to the side walls, the combination therewith of at least one crop divider mounted on and extending forwardly from a side wall and comprising: a generally fore and aft divider frame; a first transverse pivot means adjacent the rearward end of the divider frame swingably mounting the divider frame on the side wall for vertical adjustment relative thereto between a lower operating position and a raised transport position; a divider skin mounted on the divider frame and including a forwardly converging forward portion tapering to a divider point located adjacent the ground when the frame is in its operating position; lock means selectively operative between the divider frame and the platform side wall for selectively locking the divider frame to the side wall in a selected position about said first pivot means; and connecting means operatively connecting the divider frame to the adjacent reel arm for vertical adjustment of the divider when the divider frame is not locked to the side wall in response to a predetermined amount of vertical adjustment of the reel arm.

2. The invention defined in claim 1 wherein the connecting means includes a lost motion means operative between the reel arm and the divider frame for permitting a limited amount of vertical adjustment of the reel arm and divider frame independent of one another.

3. The invention defined in claim 1 wherein the connecting means includes a generally fore and aft outrigger member, an axially transverse second pivot means connecting the rearward end of the outrigger member to the reel arm, and slide means attached to the divider frame and slidably engaging the outrigger member to prevent lateral movement of the divider frame relative to the outrigger member, the slide means sliding along the outrigger member during vertical swinging of the divider frame.

4. The invention defined in claim 3 wherein the connecting means includes a stop means operative between the divider frame and the outrigger member to limit the relative movement between the slide means and the outrigger member so that after a predetermined amount of lifting of the outrigger member via the reel arm, the reel arm also raises the divider frame.

5. The invention defined in claim 1 and including spring means operative between the divider frame and the platform side wall for biasing the divider frame upwardly about the first pivot means to at least partly counterbalance the weight of the divider.

6. The invention defined in claim 1 wherein the divider skin includes a generally fore and aft inner wall along the forward portion of the divider skin and disposed forwardly of the reel and inwardly of the end of the crop engaging members.

7. The invention defined in claim 6 and including a shoe having a pointed forward end and a third axially transverse pivot means mounting the shoe on the lower forward end of the divider frame, the shoe engaging the ground when the divider is in its lower operating position and forming the divider point.

8. In a harvesting machine having a fowardly disposed transversely elongated platform including a frame with opposite upright side walls and a crop handling means mounted on the frame and including a harvester reel mounted on and extending between a pair of generally fore and aft arms mounted on the frame for vertical adjustment and including control means for controlling the position of the arms, and transverse crop engaging members having opposite ends inwardly of and adjacent to the side walls, the combination therewith of at least one crop divider mounted on and extending forwardly from a side wall and comprising: a generally fore and aft divider frame; a first transverse pivot means adjacent the rearward end of the divider frame swingably mounting the divider frame on the side wall for vertical adjustment relative thereto between a lower operating position and a raised transport position, a divider skin mounted on the divider frame and including a forwardly converging forward portion tapering to a divider point located adjacent the ground when the frame is in its operating position; a generally fore and aft outrigger member; means connecting the rearward end of the outrigger member to the platform frame and including a second transverse pivot means permitting vertical swinging of the outrigger member; and slide means connected to the divider frame and slidably engaging the opposite sides of the outrigger member to prevent lateral movement of the divider frame relative to the outrigger member, the slide means sliding along the outrigger member to permit vertical swinging of the divider frame.

9. The invention defined in claim 8 wherein the means connecting the outrigger member to the platform frame includes a reel lift arm, the second pivot means being carried by the reel lift arm so that vertical adjustment of the reel lift arm raises the rearward end of the outrigger member and including lost motion means operative between the outrigger member and the divider frame to raise the divider frame after the rearward end of the outrigger member raises a predetermined amount.

10. The invention defined in claim 9 wherein the lost motion means includes a first stop element mounted on the forward end of the outrigger member and a second stop element attached to the divider frame and engageable by the first stop element.

11. The invention defined in claim 8 and including spring means operative between the divider frame and the platform side wall for biasing the divider frame upwardly about the first pivot means to at least partly counterbalance the weight of the divider.

12. The invention defined in claim 8 and including lock means selectively operative between the divider frame and the platform side wall for selectively locking the divider frame to the side wall in a selected position about said first pivot means.

13. In a harvesting machine having a forwardly disposed transversely elongated platform including a frame with opposite upright side walls and a crop handling means mounted on the frame and including a harvester reel mounted on the platform and having a plurality of transverse crop engaging members having opposite ends inwardly and adjacent to the opposite side walls, the combination therewith of at least one crop divider mounted on and extending forwardly from a side wall and comprising: a generally fore and aft divider frame; means mounting the divider frame on a platform side wall; a divider skin mounted on the divider frame and including a forwardly converging forward portion tapering to a divider point located adjacent the ground when the divider is in a normal operating position, said forward portion including a generally fore and aft inner wall having a rearward end adjacent to and forwardly of the reel inwardly of the end of the crop engaging members on the reel and a generally fore and aft outer wall disposed outwardly of the ends of the crop engaging members.

14. The invention defined in claim 13 and including a shoe having a pointed forward end and axially transverse pivot means mounting the shoe on the forward end of the divider frame, the shoe engaging the ground and forming the divider point.

15. The invention defined in claim 13 wherein the means mounting the divider frame on the platform includes a transverse pivot means adjacent the rearward end of the divider frame and swingably mounting the divider frame on the side wall for vertical adjustment relative thereto between said lower operating position response a raised transport position.

16. The invention defined in claim 15 wherein the reel is mounted on the platform by means of a pair of vertically adjustable arms and including means operatively connecting the divider frame to one of the reel arms for vertical adjustment of the divider frame about said pivot means in response to a predetermined amount of vertical adjustment of the reel arm.

17. The invention defined in claim 15 wherein the connecting means includes a generally fore and aft outrigger member, an axially transverse second pivot means connecting the rearward end of the outrigger member to the reel arm, and slide means attached to the divider frame and slidably engaging the outrigger member to prevent lateral movement of the divider frame relative to the outrigger member, the slide means sliding along the outrigger member during vertical swinging of the divider frame.

* * * * *